United States Patent
Kaneko et al.

[11] Patent Number: 5,833,320
[45] Date of Patent: Nov. 10, 1998

[54] VEHICLE SEAT AND SHOCK-ABSORBING MATERIAL

[75] Inventors: Kazuyoshi Kaneko; Hiroyuki Ishihara, both of Iwata, Japan

[73] Assignee: Yamaha Hatsudoki Kabushiki Kaisha, Japan

[21] Appl. No.: 842,596

[22] Filed: Apr. 16, 1997

Related U.S. Application Data

[63] Continuation of Ser. No. 563,785, Nov. 27, 1995, abandoned.

[30] Foreign Application Priority Data

| Nov. 25, 1994 | [JP] | Japan | 6-315843 |
| Jan. 31, 1995 | [JP] | Japan | 7-036166 |
| Apr. 19, 1995 | [JP] | Japan | 7-116620 |

[51] Int. Cl.$^6$ .................................................. A47C 7/02
[52] U.S. Cl. .................. 297/452.27; 297/452.28
[58] Field of Search ................ 297/452.27, 452.28; 521/54, 55

[56] References Cited

U.S. PATENT DOCUMENTS

| 4,108,928 | 8/1978 | Swan, Jr. |
| 4,252,910 | 2/1981 | Schaefer |
| 4,524,529 | 6/1985 | Schaefer |
| 4,861,804 | 8/1989 | Nakanishi |
| 5,189,747 | 3/1993 | Mundt et al. ............ 297/452.27 |
| 5,272,001 | 12/1993 | Weisman |
| 5,332,760 | 7/1994 | Weisman |
| 5,418,257 | 5/1995 | Weisman |

FOREIGN PATENT DOCUMENTS

| 2938287 | 4/1981 | Germany |
| 4100155 | 7/1992 | Germany |
| 2-286481 | 11/1990 | Japan |
| 3-37217 | 2/1991 | Japan |
| 3-17848 | 3/1991 | Japan |

*Primary Examiner*—Laurie K. Cranmer
*Attorney, Agent, or Firm*—Knobbe, Martens, Olson & Bear, LLP

[57] ABSTRACT

A vehicle seat reduces the amount of vibrations from the vehicles engine or riding surface felt by the rider, without sacrificing the comfort and fitness of the seat. The seat desirably includes a shock-absorbing member layered with a urethane cushion member. The shock-absorbing material comprises a viscoelastic material using a super-soft urethane elastomer as a matrix resin with a low density filler of resinous microballoons. The percent weight ratio between the resinous microballoons and the resin matrix advantageously ranges from 1% to 5%. In order to provide adequate damping without presenting too hard of a feel, the viscoelastic material desirable has a normal storage modulus ($E_1$) ranging between 0.0628 MPa and 0.234 MPa, and a normal loss modulus ($E_2$) ranging between 0.0171 MPa and 0.131 MPa.

25 Claims, 20 Drawing Sheets

VEHICLE SEAT AND SHOCK-ABSORBING MATERIAL

This application is a continuation of 08/563,785 which is now abandoned.

BACKGROUND OF THE INVENTION

1. Field of the Invention

The present invention relates to shock-absorbing material, and more particularly to shock-absorbing material comprising a viscoelastic urethane elastomer which is used in a vehicle seat.

2. Description of Related Art

Vehicle seats, especially motorcycle vehicle seats, are generally constructed of a urethane foam cushion covered with a synthetic seat skin and secured on a bottom seat plate. Vibrations from the motorcycle generated by its engine, or by irregularities of a road surface, are transmitted to the motorcycle seat during operation. The urethane cushion in the seat lessens the amount of vibrations transmitted to the rider, especially to the rider's buttocks.

Although the urethane cushion softens the ride, urethane foam typically does not meaningfully isolate the rider from road and engine vibrations. Prior seats therefore have included a shock-absorbing member of a viscoelastic urethane elastomer together with a urethane cushion to provide even greater vibration absorption in the seat. The shock-absorbing member has a greater hardness and spring constant than the urethane cushion in order to provide greater vibration absorption.

Although the shock-absorbing member sufficiently reduces vibrations in the seat, the increased hardness of the shock-absorbing member creates a hard and uncomfortable seat, especially when riding for long periods of time. An abrupt and uncomfortable stiffness change also is felt at the boundary between the harder shock-absorbing member and the softer urethane cushion.

Shock-absorbing members made of a super-soft urethane elastomer have been incorporated into seats in order to provide the necessary amount of shock absorption without an uncomfortable level of hardness. However, shock-absorbing members constructed of this type of material have such high adhesive properties that they are difficult to handle during seat assembly.

SUMMARY OF THE INVENTION

A need therefore exists for a shock-absorbing material which reduces the amount of vibrations felt by the rider through the seat without sacrificing the comfort and fitness of the seat.

The present invention includes the recognition that the viscoelastic material of the shock-absorber member in the seat should have a sufficient spring constant that it absorbs and reduces vibrations transmitted to the rider. The viscoelastic material, however, should have a normal storage modulus and a normal loss modulus selected to provide the seat with a degree of comfort that prior vehicle seats have failed to achieve.

Thus, in accordance with an aspect of the present invention, an improved vehicle seat is provided. The vehicle seat comprises a seat base and a seat cushion arrangement positioned on the seat base. The seat cushion arrangement includes a cushion member and a shock-absorbing member. The seat skin surface surrounds the cushion arrangement. The shock-absorbing member comprises a viscoelastic material which includes a urethane elastomer matrix containing resinous microballoons.

An additional aspect of the present invention involves a shock-absorbing material comprises a viscoelastic urethane elastomer resin matrix containing a plurality of resinous microballoons. In a preferred embodiment, the shock-absorbing material has a normal storage modulus which is not less than 0.0628 MPa and is not greater than 0.234 MPa. A normal loss modulus of the material desirably is not less than 0.0171 MPa and is not greater than 0.131 MPa. A percentage weight ratio of the resinous microballoons to the viscoelastic urethane elastomer matrix advantageously is not less than 1% and is not greater than 5%.

BRIEF DESCRIPTION OF THE DRAWINGS

These and other features of the invention will now be described with reference to the drawings of preferred embodiments which are intended to illustrate and not to limit the invention, and in which.

DETAILED DESCRIPTION OF PREFERRED EMBODIMENTS

Figure 1:
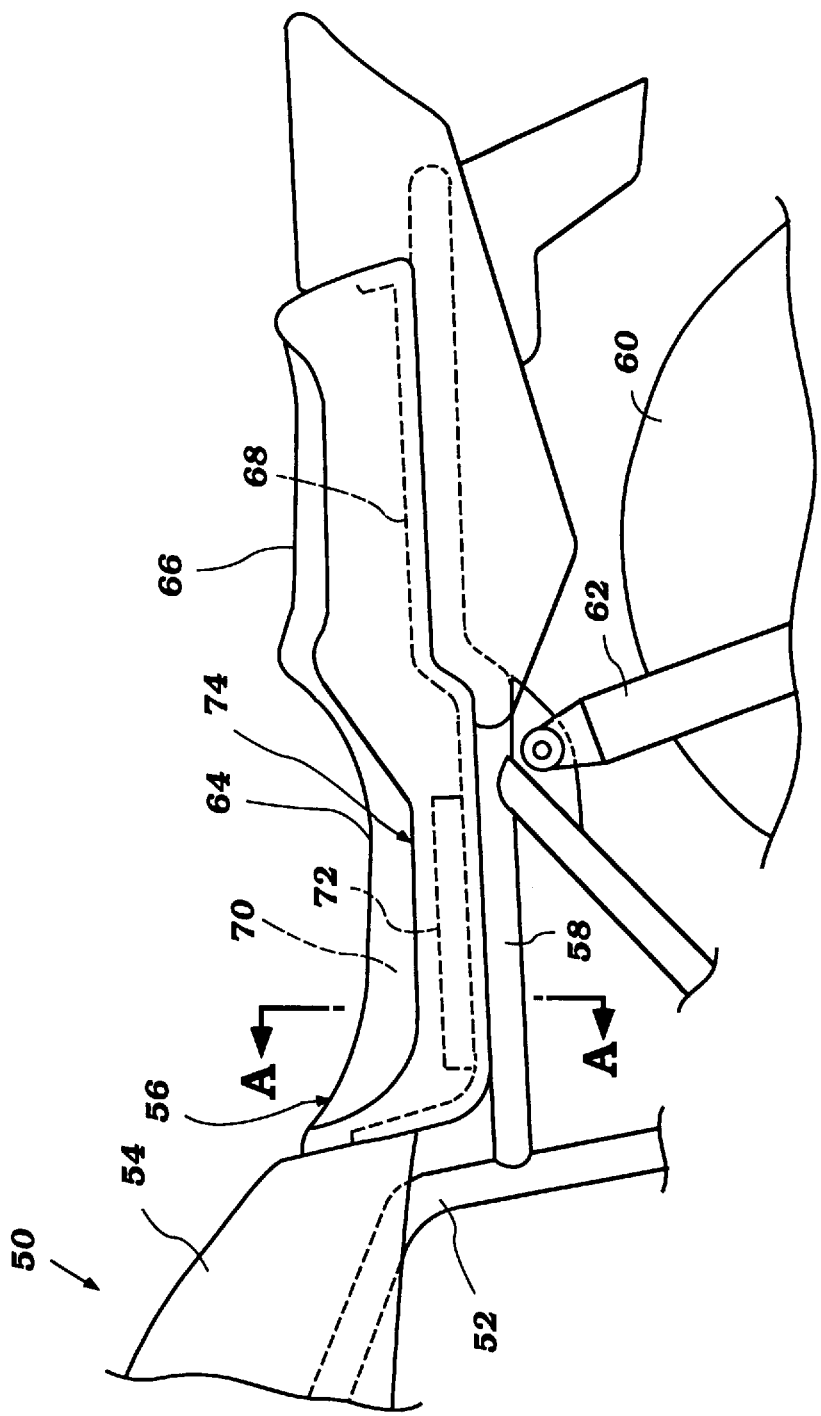
FIG. 1 is a side elevational view of a vehicle seat configured in accordance which a preferred embodiment of the present invention and applied to a motorcycle frame.

FIG. 1 illustrates a vehicle seat which is configured in accordance with the preferred embodiment of the present invention. The seat is applied to a motorcycle body; however, it is understood that the present vehicle seat can be used with other types of vehicles, such as, for example, personal watercrafts, snowmobiles, all-terrain vehicles, bicycles and the like.

The seat includes a shock-absorbing member comprising a novel viscoelastic material which is easy to handle and which effectively dampens vibrations without significantly diminishing the comfort of the seat. As used herein, "viscoelastic" means a material which has both viscous and elastic properties. The present viscoelastic material is particularly well suited for use with the vehicle seat. Those skilled in the art, however, will appreciate that the present viscoelastic material can be used in other applications. For instance, a hand grip, a foot pad, a back rest or the like can include a shock-absorbing member formed of the present viscoelastic material.

With reference to FIG. 1, a motorcycle 50, to which the vehicle seat is attached, includes frame 52. At the front of the frame 52 a fuel tank 54 is provided and at the rear of the frame 52 the motorcycle seat 56 is supported by a seat frame 58. Also at the rear of the motorcycle body frame 52, a rear wheel 60 is connected to the body frame 52 by a shock-absorber 62 and by a rear swing arm (not shown) extending from the frame 52.

In the illustrated embodiment, the seat 56 is a tandem-type seat with a front seat portion 64 on which an operating rider sits in a straddle fashion. A rear seat portion 66, or tandem seat, is provided at the rear of the seat 56 on which a passenger rider sits in a similar fashion. The seat of the present invention is not limited to a tandem-type seat and it will be apparent to those skilled in the art that other types of seat designs for any number of riders can incorporate some or all of the aspects of the present invention.

Figure 2:
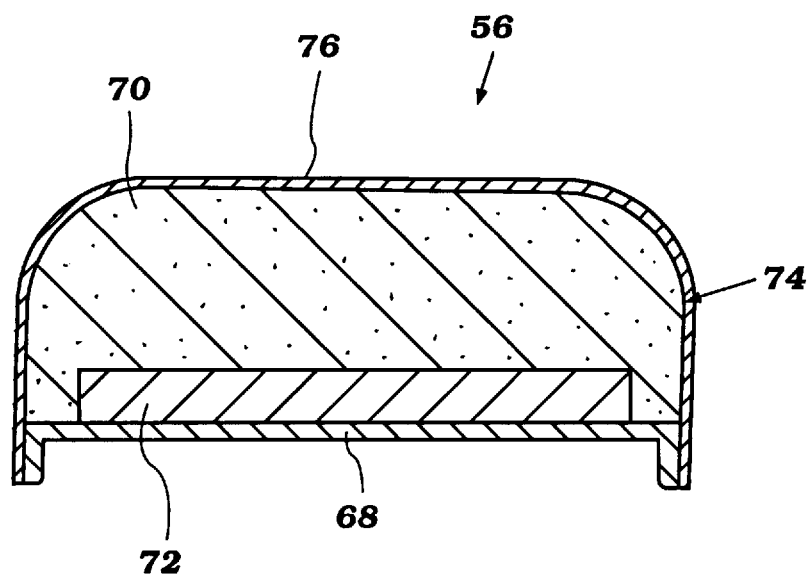
FIG. 2 is a cross-sectional view of the seat of FIG. 1 taken along the line A—A, illustrating the position of a shock-absorbing member within the seat.

With reference to FIGS. 1 and 2, the seat 56 includes a seat base 68 that is mounted on the seat frame 58 of the motorcycle 50. The seat base 68 desirably has a rigid construction and is made of plastic or sheet metal. An elastic cushion member 70 of urethane foam is supported by the seat base 68. A viscoelastic member 72, or shock-absorbing member, is placed between the seat base 68 and cushion member 70. The shock-absorbing member 72 and the cushion member 70 form a seat cushion or seat cushion arrangement 74. Although in the illustrated embodiment the seat cushion 74 includes the cushion member 70 and shock-absorbing member 72 arranged together in layers, other arrangements of the seat cushion are possible while incorporating the advantages of the present invention. Several additional vehicle seat designs are described below. The seat cushion 74 is covered with a seat skin 76 desirably constructed of a synthetic material, such as, for example, PVC leather, and a sheet of wooly nylon as a lining. The seat skin 76 is affixed to the peripheral portion of the seat base 68 in order to hold the seat cushion arrangement 74 together.

The shock-absorbing member 72 of the vehicle seat 56 desirably includes a novel viscoelastic material, as mentioned above. The present viscoelastic material uses a urethane elastomer as the matrix resin of the foam material and contains a low density filler to increase its viscosity. The urethane elastomer advantageously has an Ascar C hardness of not more than 15 measured by a durometer for soft materials, such as that available commercially from Kobunshi Keiki in K.K., Japan.

Any one of a number of super-soft urethane elastomers (i.e., urethane elastomers which have an Ascar C hardness of not more than 15) can be used as the matrix resin of the present viscoelastic material. For instance, the super-soft viscoelastic urethane elastomer can comprise a mixture of: a trifunctional polyol and difunctional polyol mixture (polyether polyol and polyester polyol); trially isocyanurate; MDI (diphenylmethane-4,4'-diisocyanate)/TDI (tolyene diisocyanate) pre-polymer; Bi-catalyst; Sn-catalyst; and phthalic acid plasticizer. Other viscoelastic urethane elastomers, such as, for example, the urethane resin disclosed in Japanese patent publication Hei 3-17848

(Applicant: IIDA Sangyo K.K.), the super soft elastomer composition disclosed in Japanese unexamined patent publication Hei 3-3217 (Applicant: K.K. Nippon Automation, et al.), and the viscoelastic urethane elastomer matrix resin sold under the trade name ELASCOAT and made by Polyurethane Kasei K.K., can be used as the matrix resin of the present viscoelastic material.

The low density filler mixed in the matrix resin desirably comprises a plurality of resinous microballoons. Each resinous microballoon includes a vinylidenechloride resin (vinylidenechloride acrylonitrile copolymer) shell (average grain size of 40–60 micrometers, grain diameter ranging from 10–100 micrometers) filled with butane gas. Such resinous microballoons are commercially available under the trade name EXPANCEL DE manufactured by EXPANCELL AB of Sweden.

The resinous microballoons desirably are mixed with the super-soft urethane elastomer in a sufficient quantity such that the resinous microballoons constitute between 1% and 5% of the weight of the super-soft urethane elastomer. It has been found that if the mixing ratio (measured as a percentage of weight) of resinous microballoons to super-soft urethane elastomer is less than 1%, the mixture will separate into two layers after molding the viscoelastic material. If the mixing ratio is greater than 5% (as measured as a percentage of weight) the mixture will include an excessive amount of air due to the high viscosity of the material during molding. The ratio of microballoons to the super-soft urethane elastomer therefore should be between 1% and 5% by weight.

The present viscoelastic material including the desired ratio of resinous microballoons to super-soft urethane elastomer advantageously has a lower adhesive property than super-soft urethane elastomer itself. It therefore is easier to handle during the seat assembly process. The material also is lightweight (e.g., has a specific gravity equal to about 0.62) and has a small impact resilience factor compared to other viscoelastic materials. For instance, the present viscoelastic material can have an impact resilience factor equal to about 8%. The present viscoelastic material also experiences minimal changes in hardness with a given change in temperature as compared with other viscoelastic materials.

Figure 3:
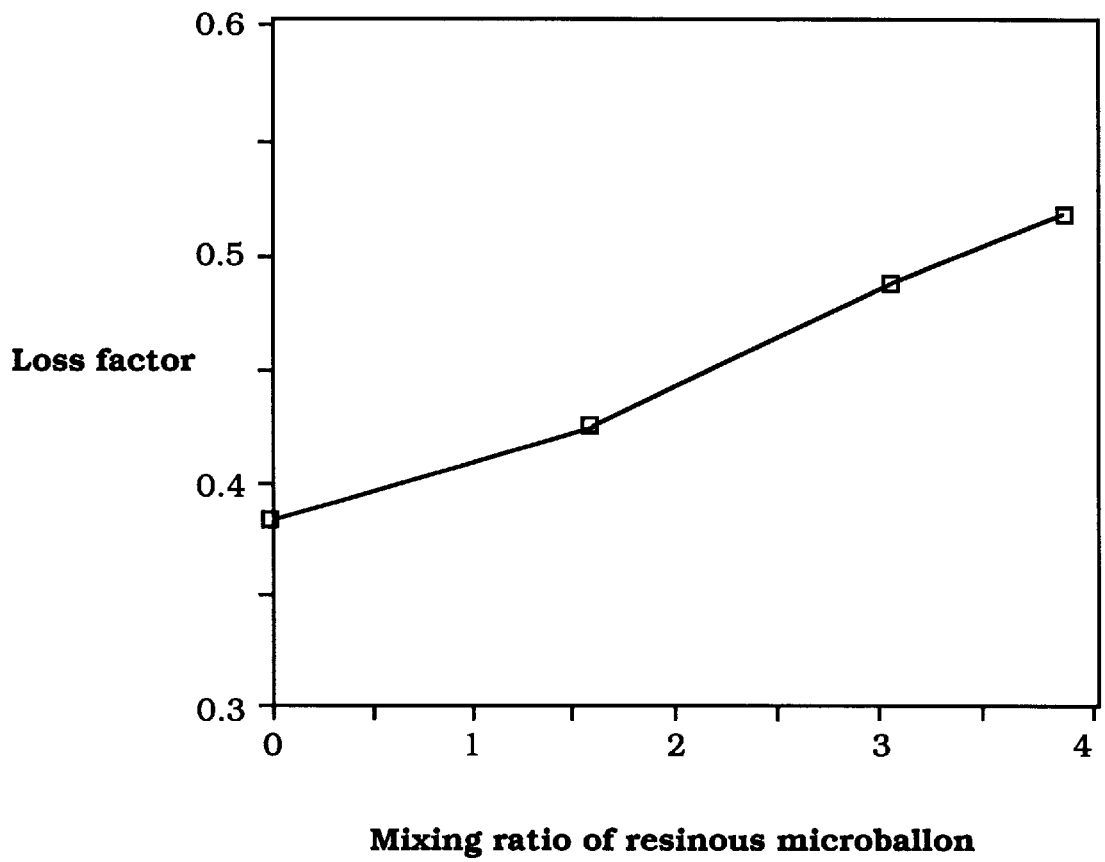
FIG. 3 is a graph illustrating the relationship between a mixing ratio percentage of resinous microballoons to the resin matrix material and a loss factor of the shock-absorbing member.

With an increasing percentage of resinous microballoons in the viscoelastic material, a loss factor of the material increases. The loss factor of the material represents the ratio between a normal loss modulus ($E_2$) of the material and a storage modulus ($E_1$) of the material. As used herein, "loss modulus" means the intrinsic property of the material which is proportional to the energy loss under a given deflection. "Storage modulus" means the intrinsic property of the material which is proportional to elastic deformation of the material. FIG. 3 illustrates the relationship between the loss factor and the weight percentage of the microballoons relative to the matrix resin. The loss factor of the viscoelastic material increases in value with an increase in the percentage of the microballoons by weight in the viscoelastic material.

Experiments have shown that a vibration transmission factor in resonance of the viscoelastic material decreases with an increase in the loss factor of the material. As used herein, the "vibrational transmission factor in resonance" means a factor or constant that is proportional to the percentage of vibrational energy transmitted through the viscoelastic material when vibrated at a resonant frequency. The presence of the resinous microballoons in the matrix resin—which provides the present viscoelastic material with a larger loss factor than super-soft urethane elastomer by itself—consequently reduces the vibration transmission factor of the present viscoelastic material. The following test results illustrate this point.

Vibrational tests were conducted to compare the vibration transmission characteristics of a cushion with the present viscoelastic material with resinous microballoon against a cushion made of only urethane foam. Vibration transmission factors were compared. The viscoelastic material used in the tests was a viscoelastic urethane elastomer (sold under the trade name Orotex U 1000, or U 1003, made by IIDA SANGYO K.K.) and included 3% resinous microballoon (sold under the trade name EXPANCEL DE made by EXPANCEL AB of Sweden).

Figure 4:
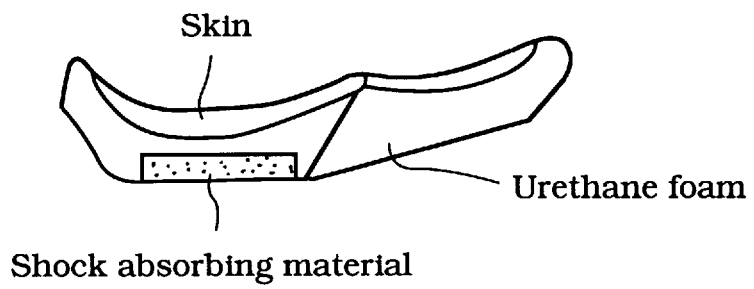
FIG. 4 schematically illustrates a partial sectional, side elevational view of an embodiment of the vehicle seat similar to that of FIG. 1 which was tested to determine vibration transmission factors at resonance between seats constructed of different materials.
Figure 5:
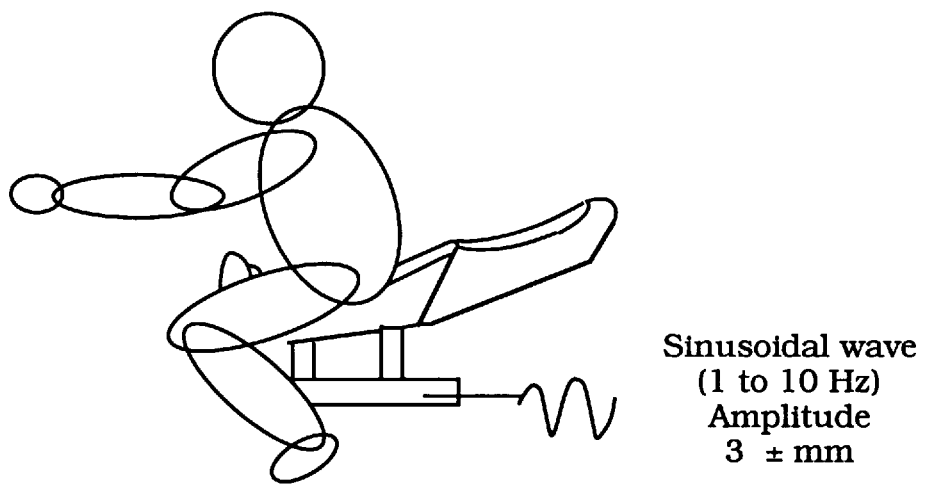
FIG. 5 schematically illustrates the vibration test method used in connection with the seat of FIG. 4.

The vibrational tests were run for the present vehicle seat which included the shock-absorbing member made of the present viscoelastic material. FIG. 4 illustrates the configuration of the present vehicle seat used in the vibrational tests. Each seat was coupled to a vibration testing machine and a rider sat on the seat in the manner shown in FIG. 5.

A sinusoidal vibration of 1–10 Hz (±3 mm amplitude in the vertical direction) was applied to the seats to simulate vibrations experienced by a rider in the seats under actual road conditions. Acceleration was measured by accelerometers placed below the seat and between the seat and the rider's buttocks. A vibrational transmission factor was obtained by calculating the ratio of the acceleration values measured.

Figure 6:
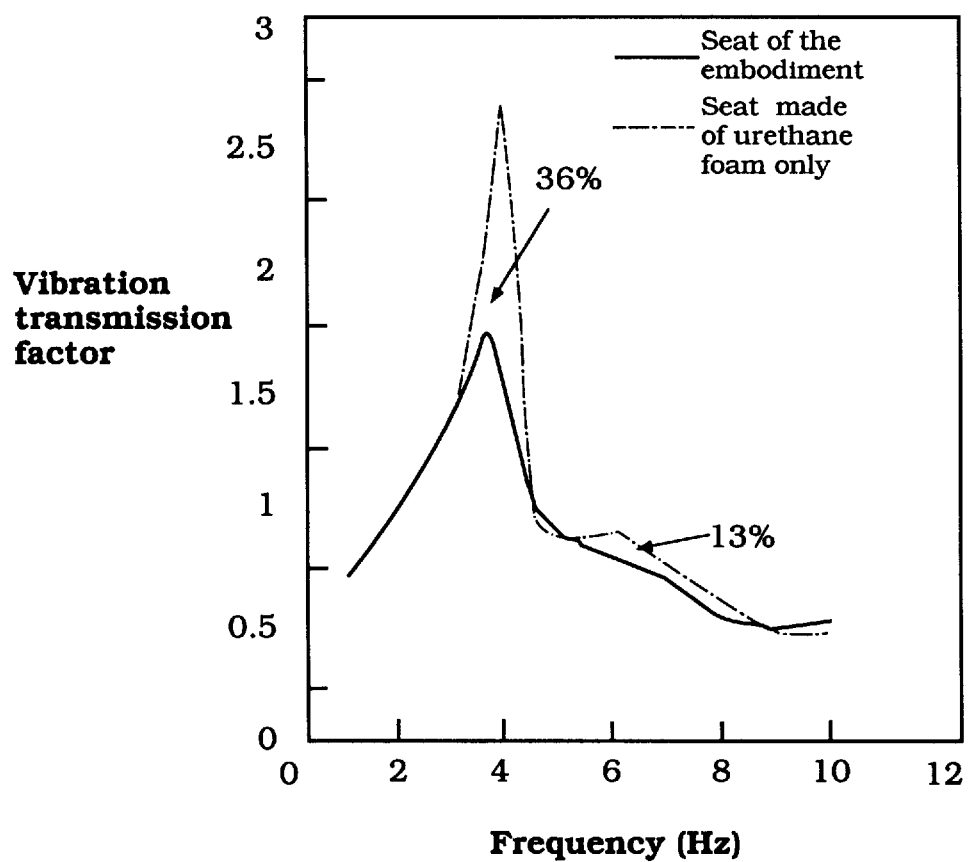
FIG. 6 is a graph comparing the vibration transmission factors of the present vehicle seat with a seat constructed of conventional urethane foam.

The graph in FIG. 6 shows the results of the vibrational testing. The vibration transmission factor of the seats of the present invention is reduced by 36% at resonant frequency and by 13% at approximately 6 Hz as compared to a seat made of urethane foam only. Because the resonant frequency of a human rider's abdomen is approximately between 4–8 Hz, the seat of the present invention also dampens resonance in a rider's abdomen.

The combination of the super-soft urethane elastomer and the resinous microballoons also give the present viscoelastic material a reduced hardness. This is because the intrinsic normal storage modulus ($E_1$) and normal loss modulus ($E_2$) of the viscoelastic material advantageously fall within desired ranges for these properties.

Through empirical work, it was determined that in order to optimize the comfort of the seat while effectively damping the transmission of road and engine vibrations through the seat, the viscoelastic material of the shock-absorbing member in the seat should have a normal storage modulus ($E_1$) and a normal loss modulus ($E_2$) falling within the following ranges:

$$0.0628 \text{ MPa} < E_1 < 0.234 \text{ MPa}$$

$$0.0171 \text{ MPa} < E_2 < 0.131 \text{ MPa}$$

As used herein, the unit MPa (i.e., Mega-Pascal) means $0.101972 \text{ kg}_f/\text{mm}^2$. The following elaborates on the empirical tests conducted to determine the desired ranges of the normal storage modulus ($E_1$) and the normal loss modulus ($E_2$) of the viscoelastic material for optimizing vibration absorption (i.e., damping) and comfort in the vehicle seat, especially for riding for long durations of time.

Values for storage spring constant, viscosity coefficient, apparent (i.e., empirically measured) normal storage modulus ($G_1$) and apparent (i.e., empirically measured) normal loss modulus ($G_2$) were determined in accordance with "Test 1" of Japanese Industrial Standard (JIS) K 6394-1976 for various viscoelastic materials identified as specimens A through G. The results are shown in Table 1 below.

TABLE 1

| | Test 1 | | | |
|---|---|---|---|---|
| Specimens | Storage Spring Constant N/mm | Viscosity Coefficient N - sec/mm | Apparent Normal Storage Modulus ($G_1$) MPa | Apparent Normal Loss Modulus ($G_2$) MPa |
| A | 41.2 | 0.147 | 0.105 | 0.016 |
| B | 85.9 | 0.824 | 0.219 | 0.092 |
| C | 270 | 2.58 | 0.687 | 0.288 |
| D | 224 | 2.32 | 0.570 | 0.260 |
| E | 386 | 6.34 | 0.984 | 0.710 |
| F | 588 | 7.78 | 1.50 | 0.870 |
| G | 349 | 6.09 | 0.889 | 0.682 |

Values for rebound angle (H) and transmitted acceleration (a) also were evaluated for each of the viscoelastic materials (specimens A–G) in "Test 2" and the results are shown in the Table 2 below.

TABLE 2

| | Test 2 | |
|---|---|---|
| Specimens | Rebound Angle (H) C.° | Transmitted Acceleration (a) G |
| A | 11.9 | 5.82 |
| B | 8.1 | 11.1 |
| C | 5.4 | 20.2 |
| D | 4.0 | 22.5 |
| E | 1.4 | 33.5 |
| F | 1.2 | 35.0 |
| G | 3.4 | 24.3 |

Test 2 involved the following experiments; however, it is understood that the rebound angle (H) and the transmitted acceleration (A) can be determined in a variety of different ways which will be readily apparent to those skilled in the art.

Figure 7:
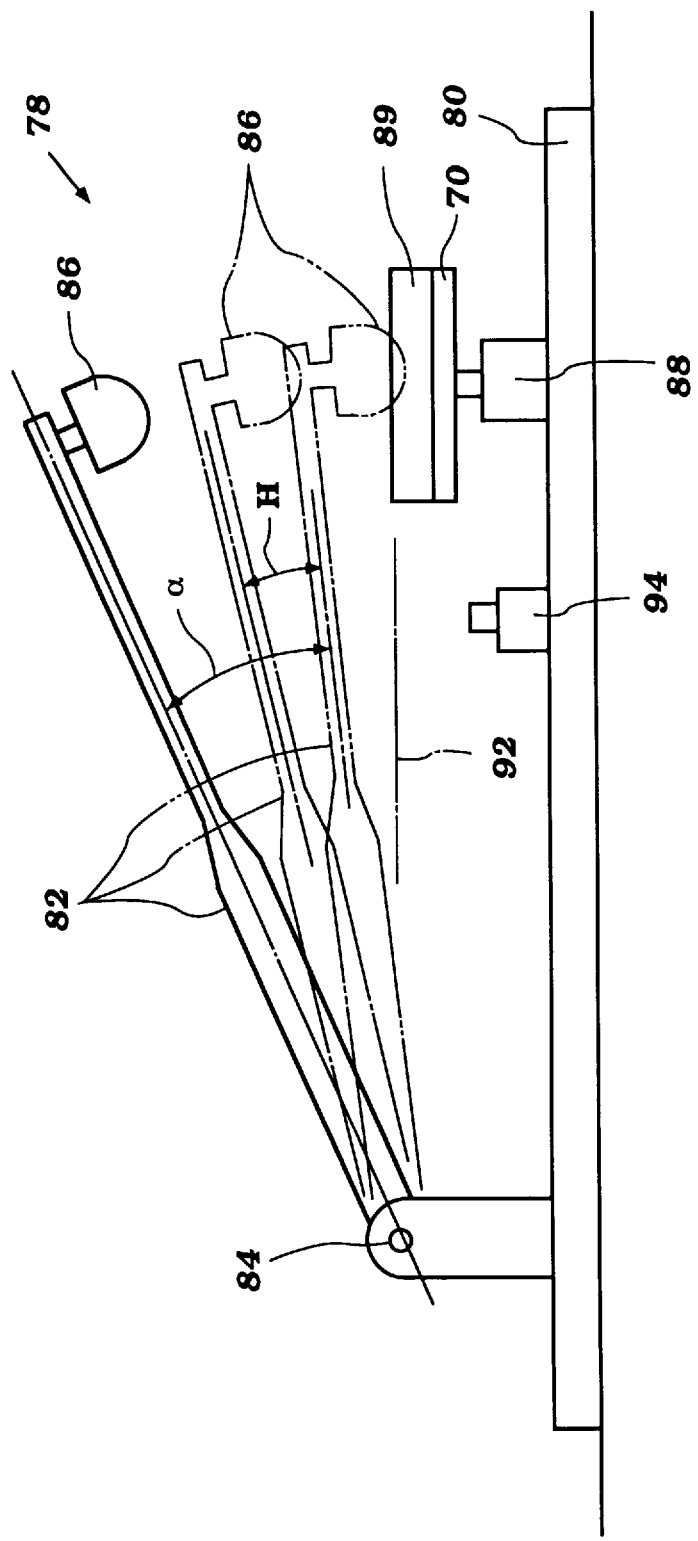
FIG. 7 is a side elevational view of a test device used in connection with "Test 2" for determining rebound angle (H) and transmitted acceleration (a) of particular material test samples.

The rebound angle (H) and the transmitted acceleration (a) were determined using the test device 78 shown in FIG. 7. The test device 78 included a base 80 and a swing arm 82 that was pivotally mounted to the base 80 by a pivot shaft 84. The construction of the test device allowed for up-and-down swinging movement of a metal weight 86 mounted at the end of the swing arm 82. The swing arm 82 had a length of 30 mm measured from the pivot shaft 84 to the weight 86.

The test device 78 included at least two weights 86. The weights 86 had different shapes. One weight 86 had a semi-spherical shape with a diameter of 30 mm, and the other weight 86 had a disc shape with a diameter of 50 mm. Both weights 86, however, had the same mass (M): 200 g. The weights 86 removably attached to the swing arm 82 so as to be interchanged.

A support 90 of the test device 78 supported a test piece 89 of each specimen under the weight 86 and over a load cell 88. When properly positioned on the support 90, the upper surface of the test piece 89 rests in the same horizontal plane 92 as the pivot axis of the pivot shaft 84.

Each viscoelastic test piece 89 (specimens A through G) had a diameter of about 100 mm and a thickness of about 20 mm. The test piece also had a measurable mass (m).

The load cell 88 was provided between the base 80 and the support 90. The load cell sensed the percussive load applied by the weight 86 and transmitted through the test piece 89 when the weight 86 struck the viscoelastic test piece 89, as described below.

When measuring rebound angle (H) of the viscoelastic test piece 89, the viscoelastic test piece 89 was provided on the support 90 and the semi-spherical weight 86 was attached to the swing arm 82. The swing arm 82 was then pivoted upward to an angle of α=30° with the imaginary horizontal plane 92. From this position, the weight 86 was dropped freely and struck the viscoelastic test piece 89. A laser displacement meter 94 provided on the base 80 measured the maximum rebound angle (H) of the swing arm 82 after rebounding from striking the test piece 92.

Figure 8:
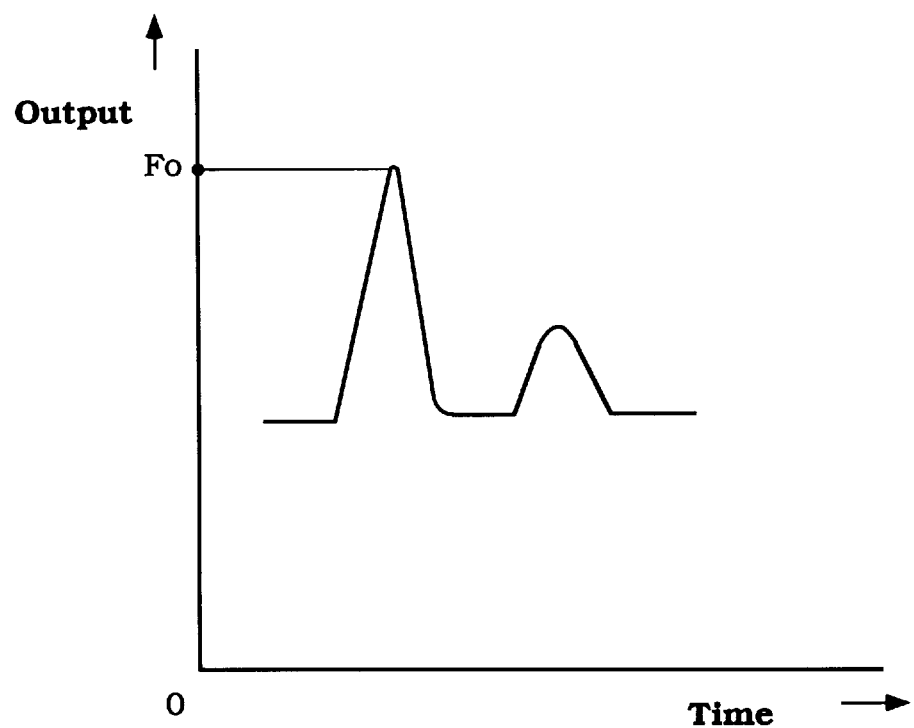
FIG. 8 is a graph of an output signal from a load cell of the test device of FIG. 7 over time.

Measuring the transmitted acceleration (a) of the viscoelastic material was performed in a similar manner using the test device 78. Each viscoelastic test piece 89 (specimens A through G) was placed on the support 90 and the disc weight 86 was attached to the end of the swing arm 82. The swing arm 82 was again pivoted upward until it reached an angle of α=30° with the horizontal line 92. From this position, the weight 86 was dropped freely and struck the viscoelastic test piece 89. The load cell 88 measured the applied percussive force transmitted through the test piece 89 and generated an output signal ($F_o$) indicative of the load. FIG. 8 illustrates a graph of the output signal from the load cell 88 over time. The transmitted acceleration (a) for each test piece 89 of viscoelastic material (specimens A through G) was calculated from the following transmitted acceleration equation, knowing the applied load ($F_o$), the mass of the weight (M), and the mass of the test piece (m):

$$A=F_o(M+m)$$

A sensory evaluation test for several of the viscoelastic specimens (A through E) also was made to evaluate a rider's comfort in terms of hardness and vibration damping. Table 3 sets forth the test results.

TABLE 3

| Specimens | Riding Test Evaluation |
|---|---|
| A | Poor |
| B | Fair |
| C | Good |
| D | Good |
| E | Good |

Figure 9:
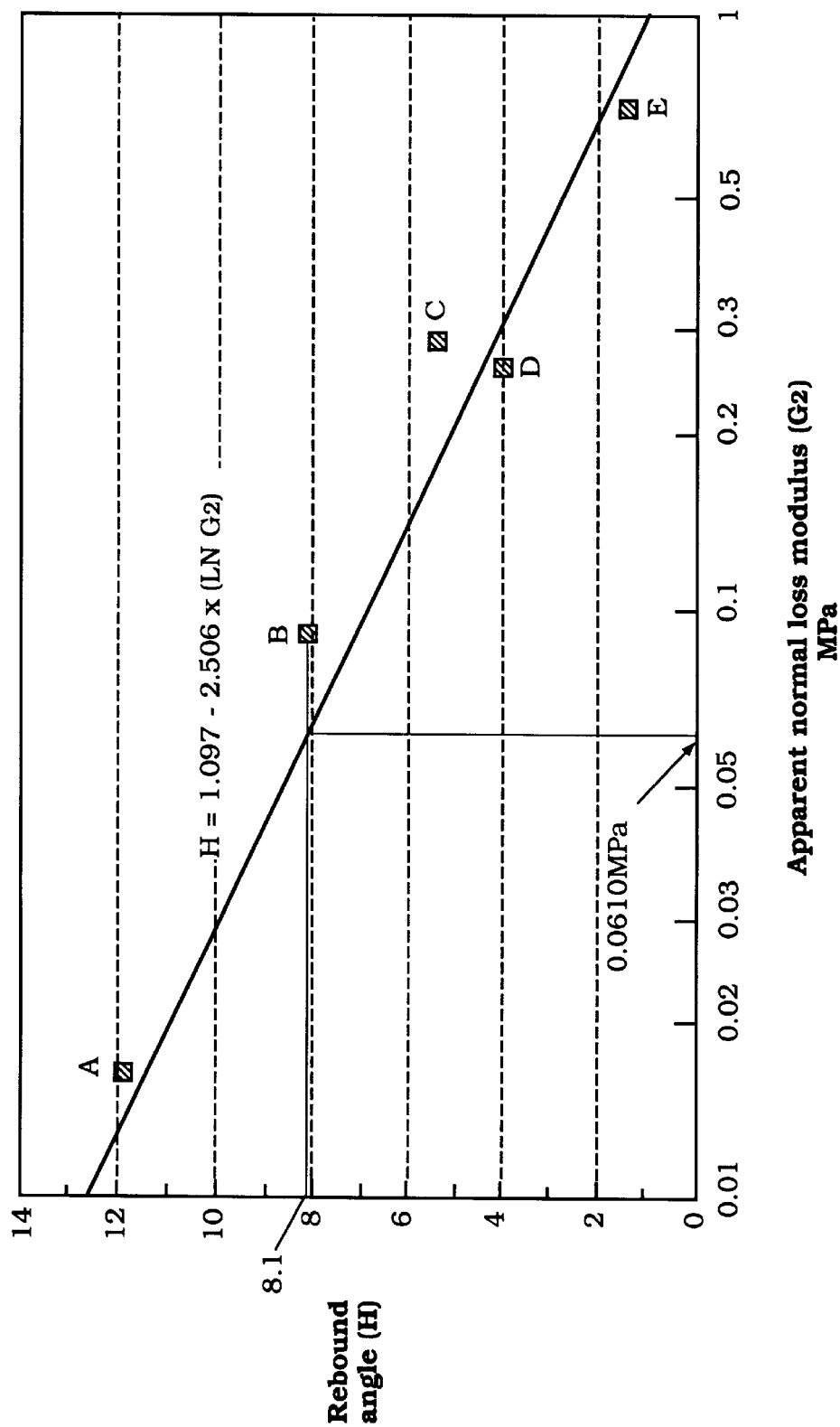
FIG. 9 is a graph showing the relationship between the rebound angle and the apparent normal loss modulus for tested material samples.

The relationship between the apparent normal loss modulus (G2) for the viscoelastic test pieces (specimens A–E) in Table 1 and the rebound angle (H) for the same viscoelastic test pieces (specimens A–E) from Table 2 is plotted on the graph illustrated in FIG. 9, with the X-axis on a natural log scale. The graph illustrates that the rebound angle (H) of the viscoelastic material is a function of the apparent normal loss modulus ($G_2$) of the material. This relationship can be expressed by the following equation derived from the linear fit of the plotted points:

$$H=1.097-2.508 \ (natural \ log \ of \ G_2) \tag{1}$$

Taken together, Table 3 and the graph illustrated in FIG. 9 reveal that in order to provide a fairly comfortable ride, the rebound angle (H) desirably is no greater than 8.1°. This was determined because specimen B provided fair comfort to the rider and specimens C through E provided good comfort. Specimen B has a measured rebound angle of 8.1°.

An apparent normal loss modulus ($G_2$) of 0.061 MPa is obtained by inserting the rebound angle (H) of 8.1° into Equation 1. It therefore can be deduced that when the apparent normal loss modulus ($G_2$) of the viscoelastic material is greater than 0.061 MPa, i.e., $$(G_2) > 0.061 \text{ MPa}, \tag{2}$$

the viscoelastic material sufficiently dampens vibrations and shocks.

Further sensory evaluations were conducted on specimens B through G in order to determine the relationship between the apparent normal storage modulus ($G_1$) for the viscoelastic test pieces (specimens B–G), see Table 2, and the comfort of the ride produced by vehicle seats including shock-absorbing members made of the various specimens B–G. That is, viscoelastic test pieces (B–G) were provided in respective cushions and tests were conducted for determining sensory evaluations in a rider's buttocks while riding on the seat. The test results are shown in the Table 4.

TABLE 4

| Specimens | Riding Test Evaluation |
|---|---|
| B | Good |
| C | Good |
| D | Good |
| E | Poor |
| F | Poor |
| G | Fair |

Figure 10:
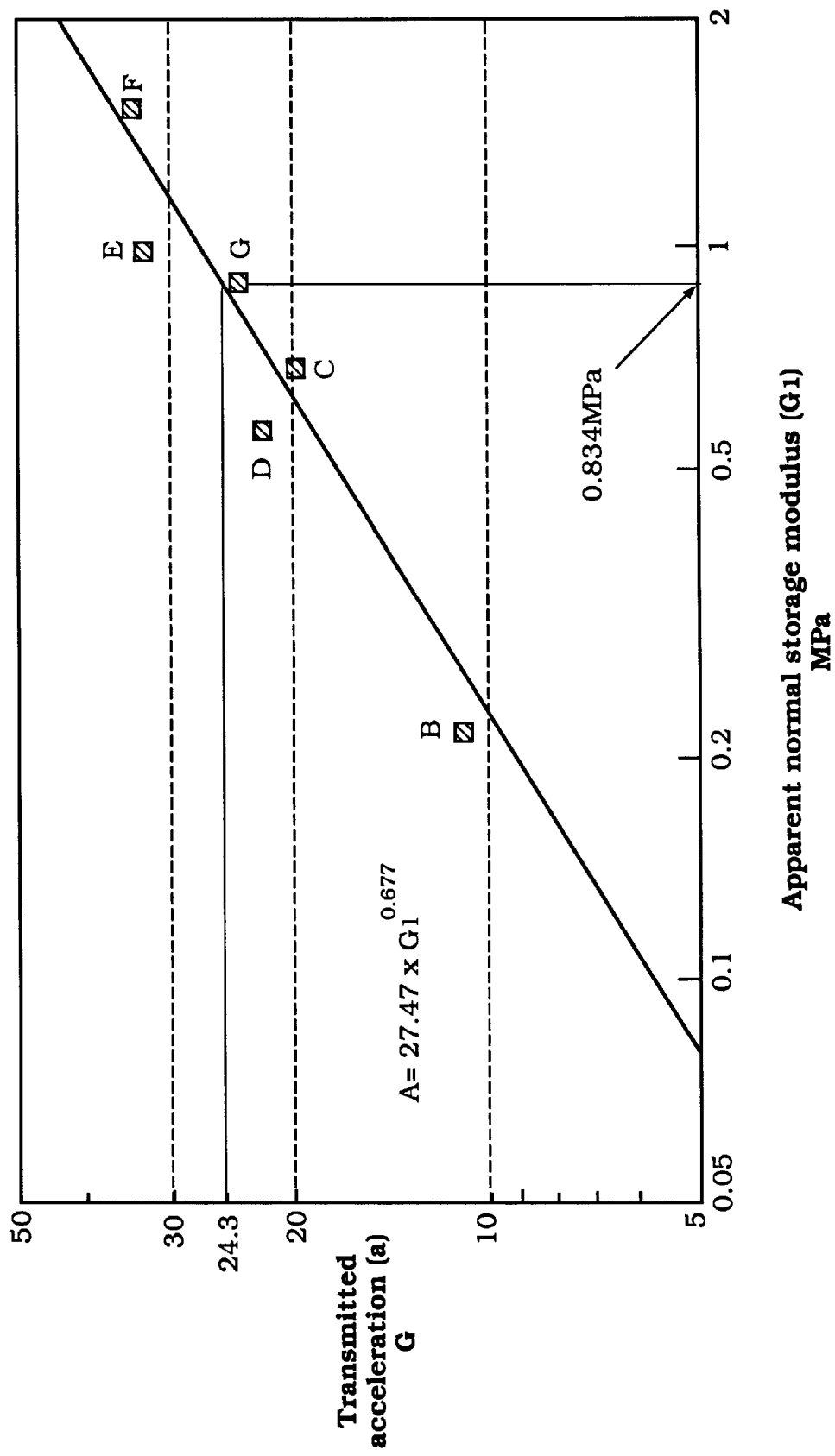
FIG. 10 is a graph showing the relationship between the transmitted acceleration (a) and the apparent normal storage modulus ($G_1$) for the tested samples.

The relationship between the apparent normal storage modulus ($G_1$) for the viscoelastic test pieces (B–G), reported in Table 2, and the transmitted acceleration (a) for the same viscoelastic test pieces (B–G), as reported in Table 4, is plotted on the graph shown in FIG. 10, on a natural log scale. The graph of FIG. 10 illustrates that the transmitted acceleration (a) through the viscoelastic material is a function of the apparent normal storage modulus ($G_1$) of the material. This relationship can be expressed by the following equation derived from a linear fit of the plotted points:

$$A = 27.47 \times G_1^{0.677} \tag{3}$$

Taken together, Table 4 and the graph illustrated in FIG. 10 reveal that in order to provide a fairly comfortable ride, the transmitted acceleration (a) desirably is not greater than 24.3 G. This was determined because specimen G provided fair comfort to the rider and specimens B through D provided good comfort. Specimen G has a measured transmitted acceleration of 24.3 G.

An apparent normal storage modulus ($G_1$) of 0.834 MPa is obtained by inserting a transmitted acceleration (a) of 24.3 G into Equation 3. It therefore can be deduced that when the apparent normal storage modulus ($G_1$) of the viscoelastic material is less than 0.843 MPa, i.e., $$(G_2) < 0.834 \text{ MPa}, \tag{4}$$

the viscoelastic material sufficiently dampens vibrations without overly stiffening the seat and causing the rider's buttocks to ache, especially when riding for long durations of time.

Figure 11:
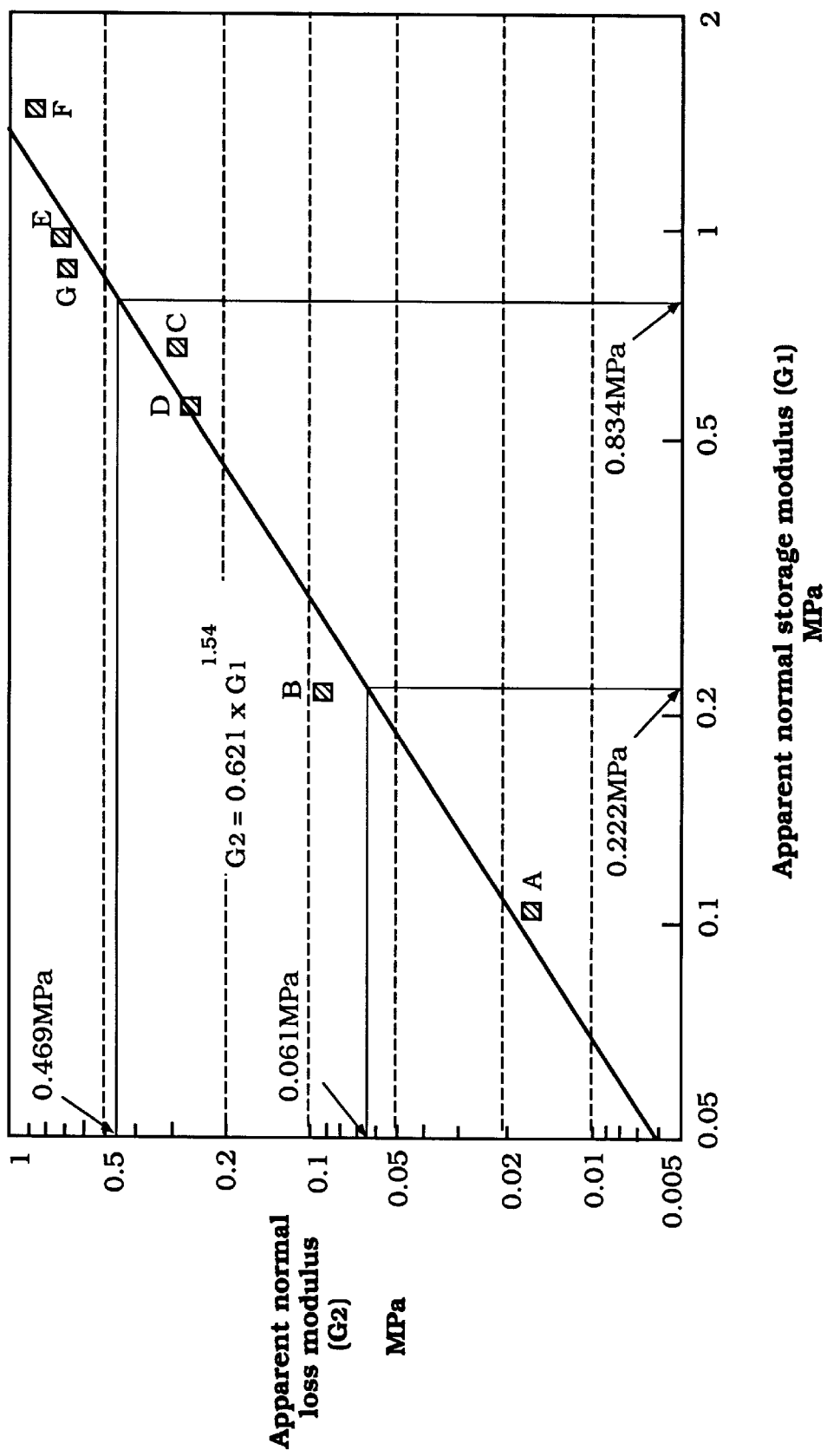
FIG. 11 is a graph showing the relationship between the apparent normal loss modulus ($G_2$) and the apparent normal storage modulus ($G_1$) for the tested samples.

The relationship between apparent normal storage modulus ($G_1$) and the apparent normal loss modulus ($G_2$) of the sample viscoelastic materials can be derived by plotting the apparent normal loss modulus ($G_2$) of the materials against the apparent normal storage modulus ($G_1$) of the materials on a natural log scale. The graph shown in FIG. 11 illustrates this relationship which can be expressed by the following equation derived from a linear fit of the plotted points:

$$G_2 = 0.621 \times G_1^{1.54} \tag{5}$$

After determining the lower end of the desirable range for the apparent normal loss modulus ($G_2$), Equation 5 can be solved to determine the lower end of the desirable range for the apparent normal storage modulus ($G_1$). The apparent normal storage modulus ($G_1$) equals 0.222 MPa, where the apparent normal loss modulus ($G_2$) equals 0.061 MPa. The desired range for the apparent normal storage modulus thus can be expressed as:

$$0.222 \text{ MPa} < G_1 < 0.834 \text{ MPa} \tag{6}$$

Likewise, after determining the upper end of the desirable range of the apparent normal storage modulus ($G_1$), Equation 5 can be solved to determine the upper end of the desirable range for the apparent normal loss modulus ($G_2$). The apparent normal loss modulus ($G_2$) equals 0.469 MPa, where the apparent normal storage modulus ($G_1$) equals 0.834 MPa. The desired range for the apparent normal storage modulus thus can be expressed as:

$$0.061 \text{ MPa} < G_2 < 0.469 \text{ MPa} \tag{7}$$

The measured apparent normal loss modulus ($G_2$) and measured apparent normal storage modulus ($G_1$) are dependent upon the shape of the test specimens. In order to derive the intrinsic properties of the material itself, the apparent moduli are normalized to account for the shape of the specimens. That is, the normal storage modulus ($E_1$) and normal loss modulus ($E_2$)—which are not shape dependent—are determined from the apparent moduli; i.e., the extrinsic quantity measured from the specific cylindrically shaped specimen.

The relationship between the normal storage modulus ($E_1$), the normal loss modulus ($E_2$) and the shape factor (S) of the cylindrical test piece are shown below in Equations (8) and (9).

$$E_1 = G_1/(1 + 1.645\, S^2) \tag{8}$$

$$E_2 = G_2/(1 + 1.645\, S^2) \tag{9}$$

The shape factor (S) is derived from the following equation:

$$S = d/4h$$

where d is the diameter of the rubber section (D=100 mm) and h is the thickness of the test piece (h=20 mm). Thus, Equation (10) is obtained by inserting these values into the above equation:

$$S = 1.25 \tag{10}$$

If Equation (10) is substituted into Equations (8) and (9), and Equations (8) and (9) are substituted into Equations (6) and (7), the following equations are obtained.

$$0.0628 \text{ MPa} < E_1 < 0.234 \text{ MPa} \tag{11}$$

$$0.0171 \text{ MPa} < E_2 \, 0.131 \text{ MPa} \tag{12}$$

The present viscoelastic material therefore desirably has a normal loss modulus ($E_2$) and a normal storage modulus ($E_1$) falling within the above recited ranges. The viscoelastic material with the desired moduli adequately absorbs road and engine vibrations while providing a comfortable ride to the rider, even over an extended riding period. The present vehicle seat with the novel viscoelastic material therefore reduces discomfort to and aching of the rider's buttocks due to extending riding periods.

The combination of the present viscoelastic material—which includes a mixture of super-soft urethane elastomer and resinous microballoons—and a conventional urethane foam cushion member also provides a good feeling of fitness. As used herein, "fitness" means the degree to which the seat receives the rider's buttocks as a whole and the degree of deformation of the seat. A good fitness is considered to be where the seat firmly receives the rider's buttocks as a whole without large deformation, and comes into contact mildly with the tailbone of the rider, which typically protrudes with the rider positioned in the riding posture illustrated in FIG. 5.

In order to quantify the comfort and fitness characteristics of the present vehicle seat, a number of tests on seats having shock absorbing members made of the following shock-absorbing materials were conducted:

TABLE 5

| Specimens | Material Description |
|---|---|
| H | Viscoelastic urethane elastomer matrix resin (OROTEX ™) mixed with resinous microballoons (EXPANCEL DE ™), 3% by weight |
| I | Conventional urethane foam |
| J | Urethane Foam 1 with low resilience factor (ZULEN 1 ™) |
| K | Urethane Foam 2 with low resilience factor (ZULEN 2 ™) |
| L | Urethane Foam 3 with low resilience factor (ZULEN 3 ™) |
| M | Shock-absorbing urethane foam (Poron ™) |
| N | Shock-absorbing urethane foam (Orotex U 1003 ™) |
| O | Shock-absorbing urethane foam (SORBOTHANE ™) |

These tests determined a bench evaluation value F for the feeling of fitness, a spring constant ratio p between tension and compression, and the normal storage modulus measured in accordance with Japanese Industrial Standard K6394. Table 6 sets forth the results of these tests.

TABLE 6

| Specimens | p value | F value | Normal storage modulus (Mpa)* |
|---|---|---|---|
| H | 1.30 | 57.3 | 0.102 |
| I | 0.66 | 15.7 | 0.0361 |
| J | 1.21 | 19.8 | 0.493 |
| K | 1.21 | 22.8 | 0.224 |
| L | 1.11 | 23.1 | 0.0577 |
| M | 0.964 | 16.2 | |
| N | 1.18 | 43.1 | 0.150 |
| O | 1.29 | 67.4 | 0.378 |

*The normal storage modulus is measured according to Japanese Industrial Standard K6394 for samples of 100 mm diameter and 20 mm thickness.
<Test condition>
Average strain 10%
Strain amplitude 1%
Note:
1 Mpa in the table is equal to 0.101972 kgf/mm$^2$.

The bench evaluation value F for the feeling of fitness is the ratio between the forces required to deform the test piece by 5 mm first using a concentrated force and then using a force applied over a larger area. The following describes the specific procedures involved with this test.

A tension and compression tester (shown in FIG. 12), which is available commercially under the trade name AGS 500A Autograph and manufactured by SHIMADZU CORP., was used to test the shock-absorbing material specimens for load values. A specimen was first loaded into the tester. Each specimen had a diameter of 100 mm and a thickness of 20 mm.

Figure 13:
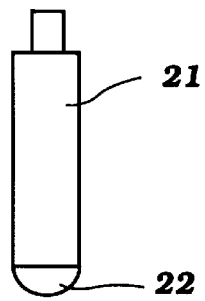
FIG. 13 is a side elevational view of a pressure jig A used with the test device of FIG. 12.
Figure 14:
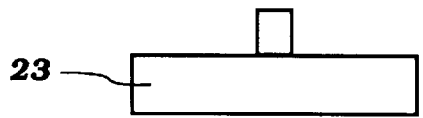
FIG. 14 is a side elevational view of a pressure jig B used with the test device of FIG. 12.

Load values were measured for each sample. Each sample was first loaded into a pressure jig A, shown in FIG. 13, and a load value X was measured when deformation of the sample reached 5 mm. Each sample was then loaded into a pressure jig B, shown in FIG. 14, and a load value Y was measured when the deformation reached 5 mm. The bench evaluation test value (F) of the feeling of fitness for the seat was calculated by inserting the measured values into the following equation:

$$F = Y/X. \tag{13}$$

Figure 12:
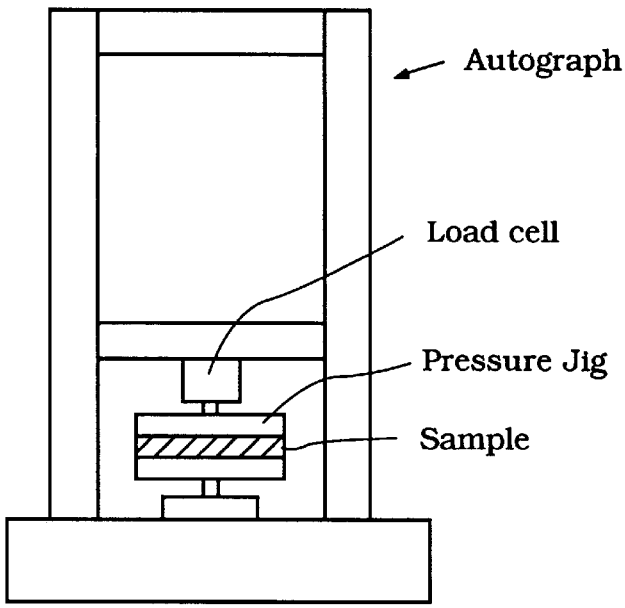
FIG. 12 is a schematic view of a compression and tension test device for testing shock-absorbing test samples.
Figure 15:
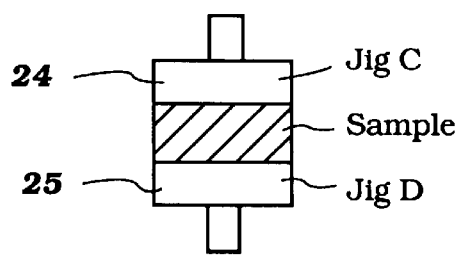
FIG. 15 is a side elevational view of pressure jigs C and D for use with the test device of FIG. 12 to measure the spring constants of the shock-absorbing test samples in compression and tension.

Using the same tension and compression tester shown in FIG. 12, each of the test samples was bonded between jigs C and D, shown in FIG. 15. The jigs C and D were also 30 mm in diameter. The spring constant ($X_1$) of each sample was measured when compressed by 2 mm. The spring constant ($X_2$) for each sample was measured when stretched by 2 mm. The ratio (P) of the spring constant in compression to the spring constant in tension was calculated by inserting the measured spring constants into the following equation:

$$P = X_1/X_2. \tag{14}$$

Sensory evaluation tests of the seats using the same shock-absorbing materials as the bench tests described above were performed and fitness and shock absorption ratings were determined from the tests. Table 7 sets forth the results of these tests.

TABLE 7

| Specimens | Feeling of fitness in sensory evaluation (feeling on the seat) | Physical shock to rider's buttocks in sensory evaluation (riding test) |
|---|---|---|
| H | Very Good | Fair |
| I | Very Poor | Very Good |
| J | | Very Poor |
| K | Fair | |
| L | Good | Fair |
| M | Very Good | Poor |

Figure 16:
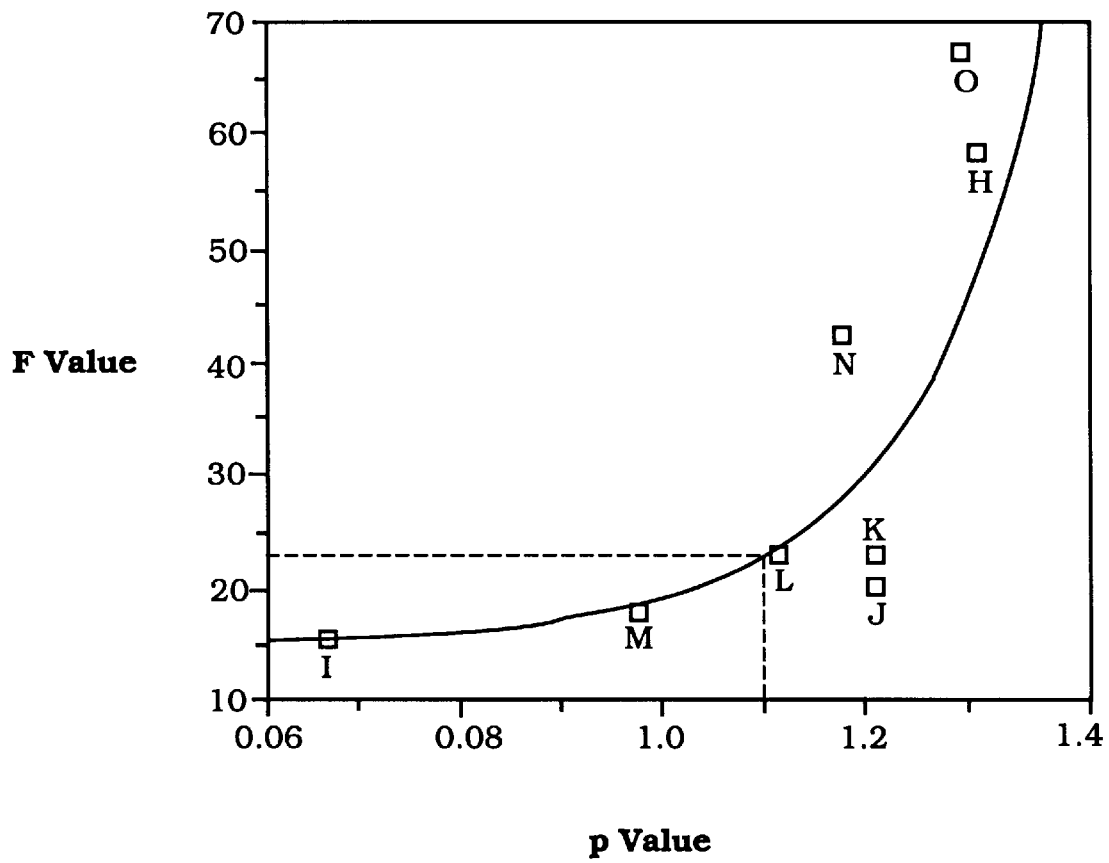
FIG. 16 is a graph of the F values of the shock-absorbing test samples plotted against their corresponding spring constant ratio p.

The relationship between the Fitness Value F and the Spring Constant Ratio p, reported in Table 7, for each of the shock-absorbing samples (specimens H–O), is plotted on the graph shown in FIG. 16. This relationship can be represented by a best curve fit of the plotted points. From the best curve fit and the results of the sensory tests reported in Table 7, it can be deduced that when a material has a spring constant ratio (p) in compression and tension greater than or equal to 1.1, the seat provides a good feeling of fitness.

Figure 17:
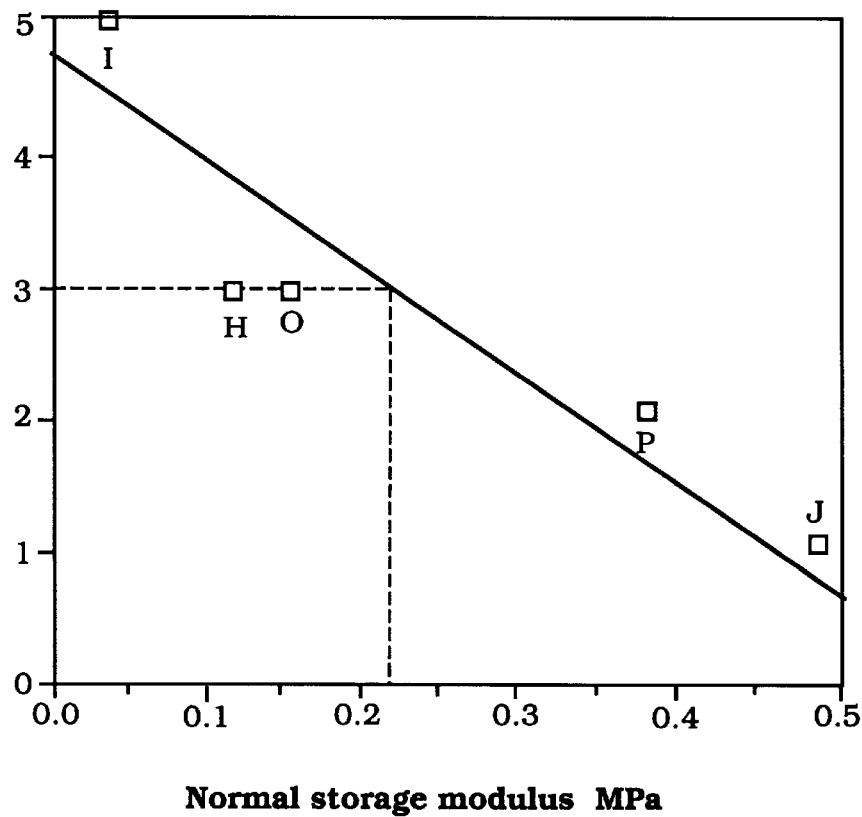
FIG. 17 is a graph of the sensory evaluation points of the shock-absorbing test samples plotted against their corresponding normal storage modulus ($E_1$)

FIG. 17 shows the relationship between the normal storage modulus for each of the shock-absorbing materials (see Table 5) and the comfort values from physical shock to the rider's buttocks from the Table 7, where 1=very poor; 2=poor; 3=fair; 4=good; and 5=very good. A linear fit through the plotted points reveals that a shock-absorbing material with a normal storage modulus of 0.22 MPa does a fair job in absorbing shock to the rider's buttocks. This result, of course, corresponds with the results of the comfort test proved above which identified a desired range of the normal storage modulus ($E_1$) as: $0.0628 \text{ MPa} < E_1 < 0.234 \text{ MPa}$.

Thus, from the test results given above, the tested embodiment of the present viscoelastic had a Spring Constant Ratio p of 1.30 and a normal storage modulus ($E_1$) of 0.102 MPa. These values indicates the present vehicle seat with the viscoelastic material described as sample H above, will provide a good feeling of fitness and comfort to the rider with little physical shock discomfort in the rider's buttocks.

Figure 18:
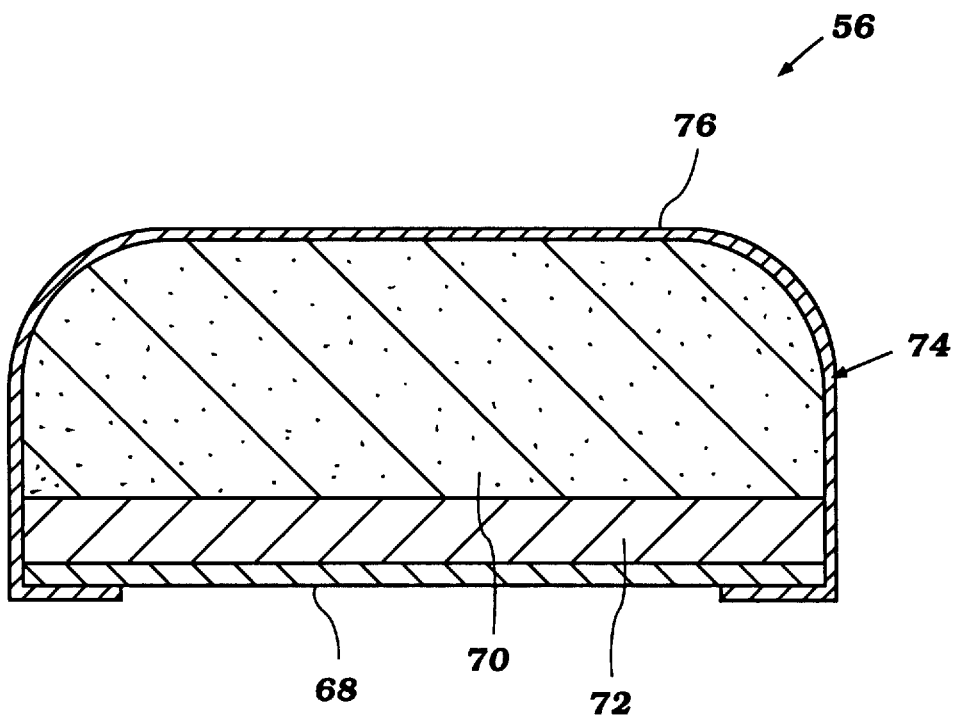
FIG. 18 is a cross-sectional view of another embodiment of the present vehicle seat with the shock-absorbing member interposed between the cushion member and the seat base.
Figure 20:
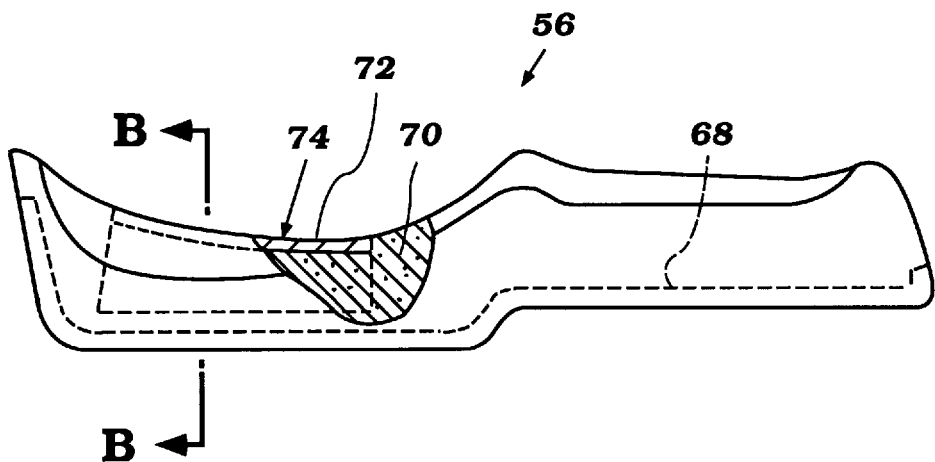
FIG. 20 is a partial sectional, side elevational view of a further embodiment of the present vehicle seat.
Figure 21:
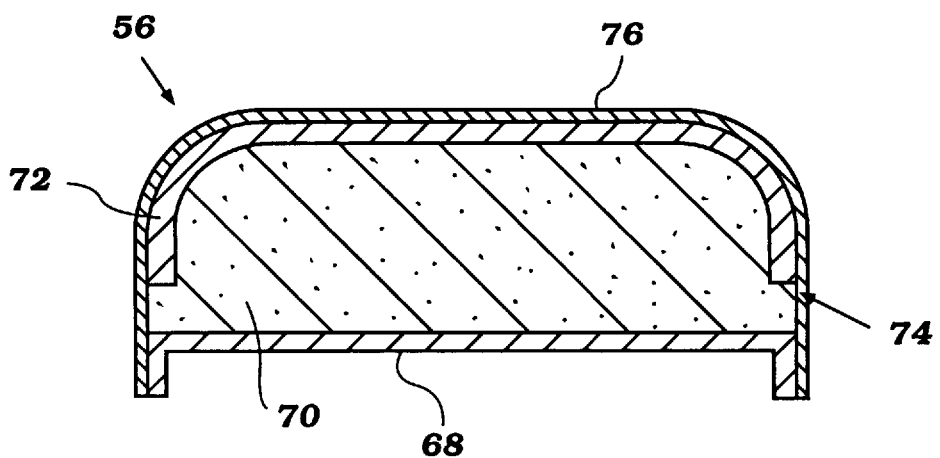
FIG. 21 is a cross-sectional view of the vehicle seat of FIG. 20 taken along line B—B.

As mentioned above, the present vehicle seat can take numerous forms other than the one described above, while embodying some or all of the principles of the present invention. For instance, FIG. 18 illustrates the shock-absorbing member as extending from side to side across the seat. The shock-absorbing member also can be layered on the upper surface of the cushion member, as shown in FIGS. 19–21, or can be assembled so as to be embedded in the cushion member of urethane foam, as shown in FIG. 22.

If the shock-absorbing member 72 is interposed between the cushion member 70 and the seat base 68, as with the embodiments shown in FIGS. 2 and 18, the cushion member 70 comes in more direct contact with a rider's buttocks. Because the cushion member 70 is softer and has a smaller normal storage modulus ($E_1$) than the viscoelastic member 72, or shock-absorbing member, the upper surface of the seat 56 is deformed so as to fit the shape of the rider's buttocks when the rider sits on the seat 56, thereby providing greater riding comfort, especially during riding for long time durations.

Figure 19:
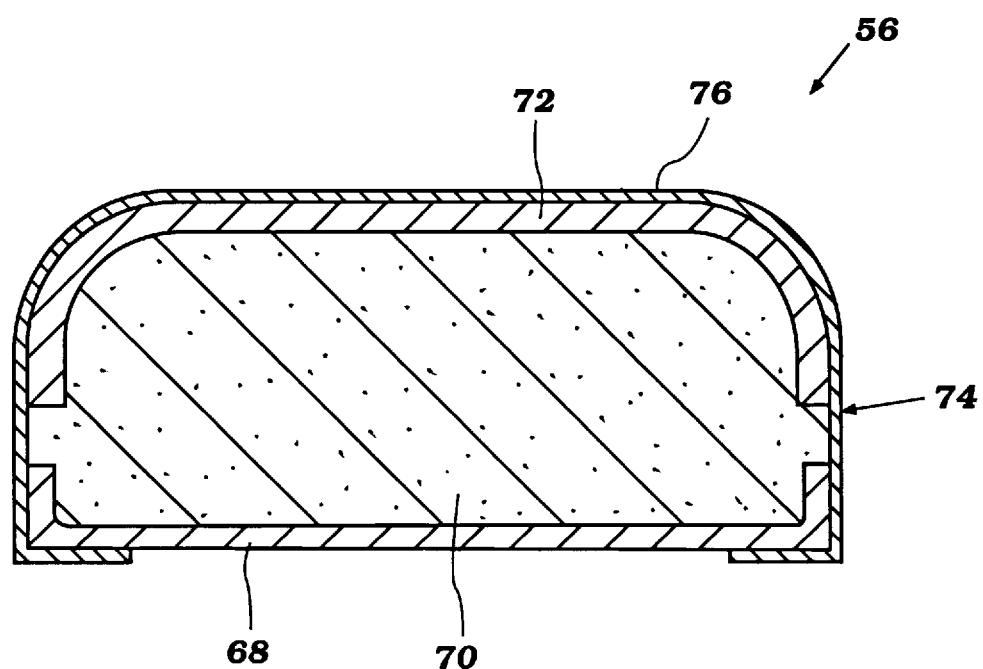
FIG. 19 is a cross-sectional view of an additional embodiment of the present vehicle seat with the shock-absorbing member layered on the upper surface of the cushion member.

If the shock-absorbing member 72 is layered on the upper surface of the cushion member 70, as shown in FIG. 19, greater vibration absorption and less vibration transmission will occur. When the shock-absorbing member 72, or viscoelastic member 70, is arranged below the cushion member, the rebound angle (H) is 12.4°. On the other hand, when the shock-absorbing member 72 is arranged over the upper surface of the cushion member, the rebound angle (H) is 9.76°. Thus, rebound of the rider's buttocks on the upper surface of the seat due to vibration will be less when the shock-absorbing member 72 is arranged on the upper surface of the cushion member 70 compared to when the shock-absorbing member 72 is arranged below the cushion member 70.

Figure 22:
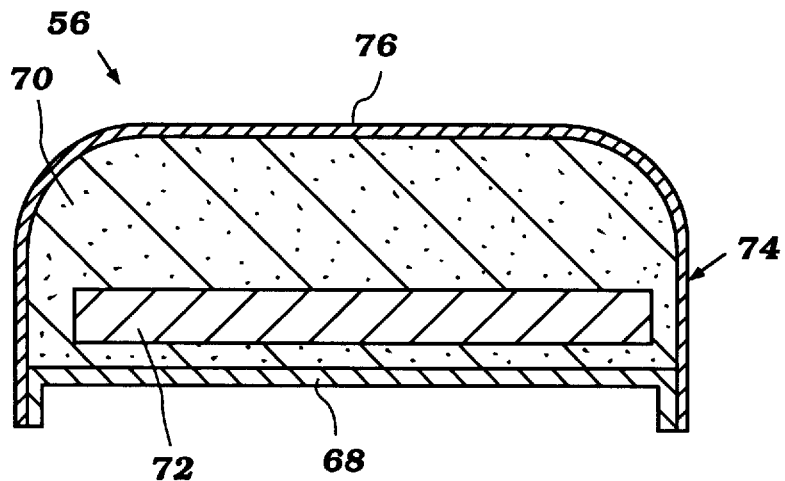
FIG. 22 is a cross-sectional view of another embodiment of the present vehicle seat with the shock-absorbing member embedded in the cushion member.

The shock-absorbing member 72 may be embedded in the cushion member 70 of urethane foam, as shown in FIG. 22. By embedding the shock-absorbing member 72 in the cushion member 70, the vibration absorption and comfort advantages of the present vehicle seat are provided; additionally, the integrity of the shock-absorbing member 72 will not be as affected by heat or gasoline vapors from the engine or the ambient atmosphere. Also, if the shock-absorbing member 72 is embedded in the cushion member 70, as opposed to providing the shock-absorbing member 72 below the cushion member 70, the shock-absorbing member 72 will not have to be formed so that it will have to fit the irregularities of the upper surface of the seat base 68, thereby reducing manufacturing costs.

Figure 23:
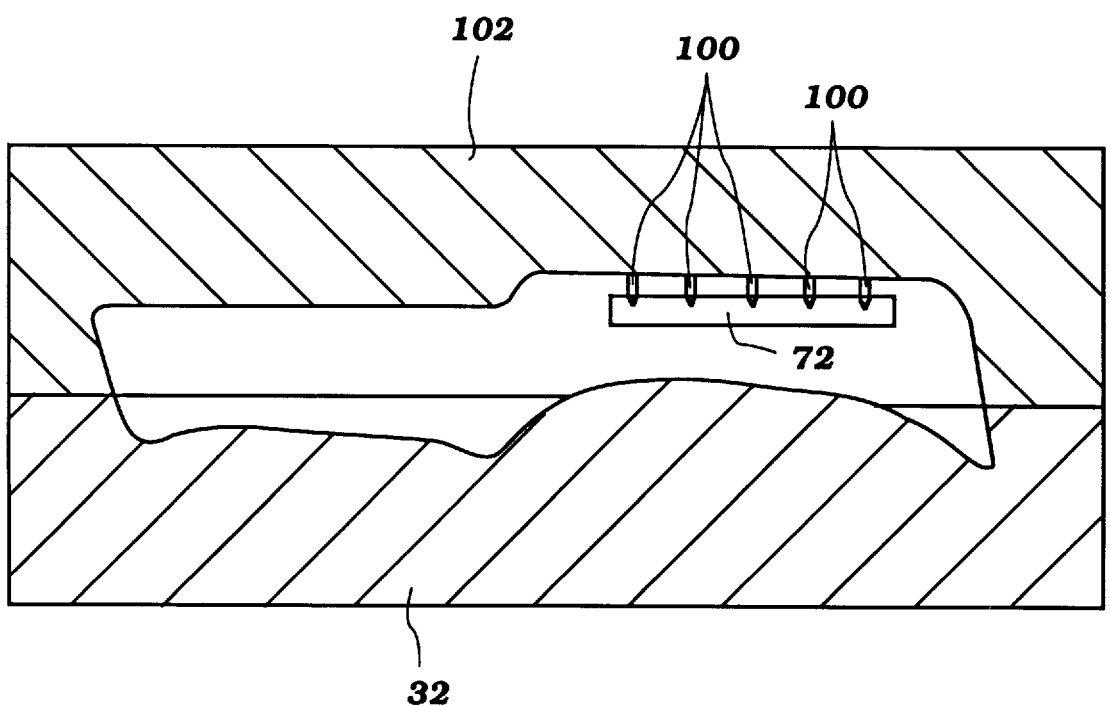
FIG. 23 is a schematic cross-sectional illustration of the assembly process of an embodiment of the present vehicle seat.

Manufacturing the shock-absorbing member 72 in the cushion member 70 is done by forming the shock-absorbing member 72 and securing the shock-absorbing member 72 with pins 100 to a molding die 102 for molding the cushion member 70 of urethane foam, as shown in FIG. 23. A urethane stock solution is poured into the die, and the urethane foam cushion member 70 is formed around the shock-absorbing member 72, creating an embedded cushion arrangement 74, as shown in FIG. 22.

In order to prevent discomfort from abrupt hardness changes between the cushion and shock-absorbing member boundaries, the shock-absorbing member 72 also may have a gradually changing normal storage modulus, as shown by the embodiments illustrated in FIGS. 24–29. Arrows in the figures indicate the direction in which the normal storage modulus gradually decreases in the shock-absorbing member 72. The embodiments of the present vehicle seat in FIGS. 24–29 indicate that the normal storage modulus gradually changes in the longitudinal, transverse and vertical directions. The normal storage modulus, however, may gradually change in any direction in order to provide the comfort, vibrational absorption and avoidance of abrupt hardness change characteristic of the present vehicle seat. Ideally, the normal storage modulus of the shock-absorbing member 72 approaches the normal storage modulus of the adjacent cushion member 70, or the normal storage modulus of whatever material is adjacent to the shock-absorbing member 72.

Figure 24:
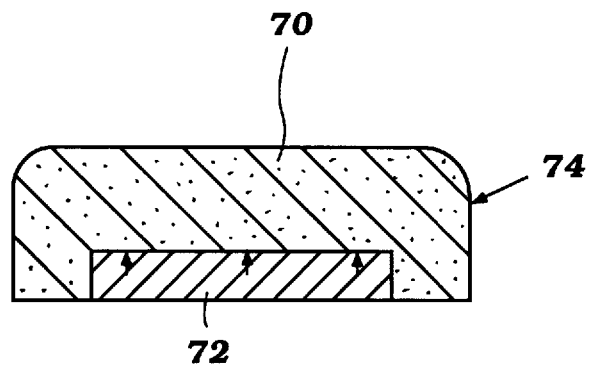
FIG. 24 is a cross-sectional view of a cushion arrangement of an additional embodiment of the present vehicle seat with the normal storage modulus ($E_1$) of the shock-absorbing member decreasing towards its upper surface.
Figure 25:
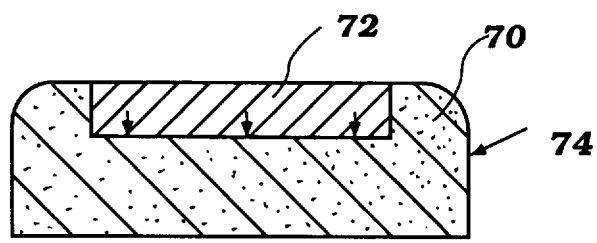
FIG. 25 is a cross-sectional view of a cushion arrangement of a further embodiment of the present vehicle seat with the normal storage modulus ($E_1$) of the shock-absorbing member decreasing towards its lower surface.
Figure 26:
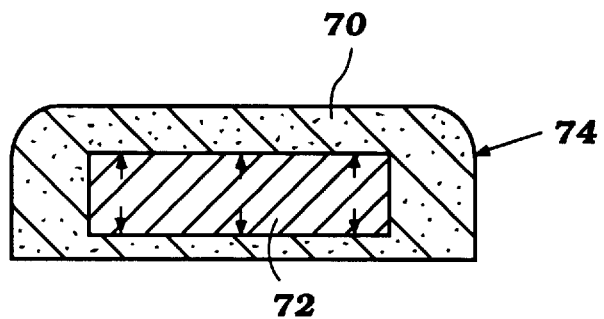
FIG. 26 is a cross-sectional view of a cushion arrangement of another embodiment of the present vehicle seat with the normal storage modulus ($E_1$) of the shock-absorbing member decreasing towards its upper and lower surfaces.

In FIG. 24, the shock-absorbing member 72 is arranged on the bottom side of the cushion member 70, and its normal storage modulus decreases toward the top face of the shock-absorbing member 72. In FIG. 25, the shock-absorbing member 72 is provided above the cushion member 70 with its normal storage modulus decreasing towards the bottom face of the shock-absorbing member 72. In FIG. 26, the shock-absorbing member 72 is embedded within the cushion member 70 with its normal storage modulus decreasing towards the top face and the bottom face of the shock-absorbing member 72.

Figure 27:
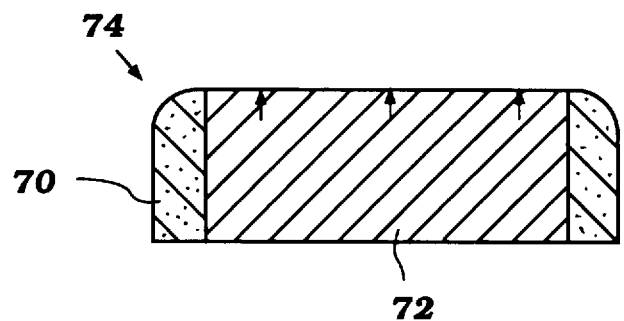
FIG. 27 is a cross-sectional view of a cushion arrangement of an additional embodiment of the present vehicle seat with the shock-absorbing member occupying the center of the cushion arrangement with the normal storage modulus ($E_1$) of the shock-absorbing material decreasing toward its upper surface.

In FIG. 27, the urethane foam cushion member 70 is arranged on both sides of the cushion arrangement 74 and the shock-absorbing member 72 occupies the center section of the cushion arrangement 74 from the top to the bottom of the cushion arrangement 74 between the cushion members 70. The normal storage modulus of the shock-absorbing member 72 decreases towards the top surface.

Figure 28:
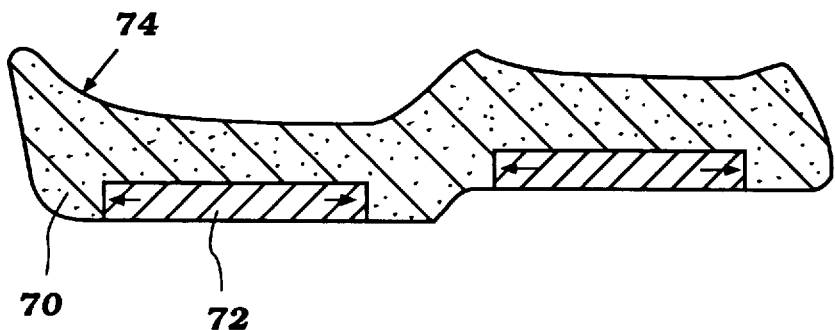
FIG. 28 is a longitudinal cross-sectional view of a cushion arrangement of a further embodiment of the present vehicle seat with the normal storage modulus ($E_1$) of the shock-absorbing members decreasing towards its longitudinal end faces.
Figure 29:
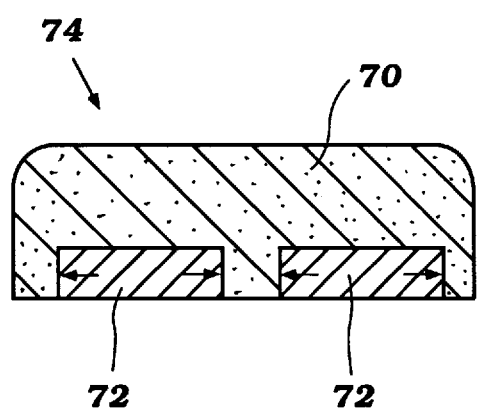
FIG. 29 is a cross-sectional view of a cushion arrangement of an additional embodiment of the present vehicle seat with the normal storage modulus ($E_1$) of shock-absorbing members decreasing towards the side faces of each member.

Although in the foregoing embodiments, the normal storage modulus has varied in the vertical direction, it is possible to vary the normal storage modulus horizontally in the longitudinal or transverse directions of the seat, as shown in FIGS. 28 and 29. In these embodiments, the normal storage modulus in the center portion of the shock-absorbing member 72 is larger and decreases towards the side faces of the shock-absorbing member 72, approaching the normal storage modulus of the adjacent cushion member 70.

Numerous methods exist for molding or forming the shock-absorbing member so that the normal storage modulus varies as described above. Several examples for forming the shock-absorbing member in order to vary the normal storage modulus will be described below; however, it is appreciated that various means to achieve varying a normal storage modulus are possible and will be readily apparent to those skilled in the art.

The normal storage modulus may be varied by varying the density of the filler in the matrix resin through gravity or centrifugal force when molding the shock-absorbing member. For example, in the shock-absorbing member of the present invention, the normal storage modulus is higher in portions of the member where the resinous microballoon filler has a greater density in the viscoelastic urethane elastomer matrix, and the modulus decreases with decreasing resinous microballoon filler density.

The normal storage modulus also can be varied by mixing a magnetic substance, such as iron powder, in the matrix resin when molding the shock-absorbing piece. A magnetic field may be used to distribute the magnetic powder in order to vary the normal storage modulus as desired.

A matrix resin that may be used in injection molding machines may be injected in a manner so that different compositions that result in different hardnesses are injected in an orderly succession from soft material compositions to hard ones.

The normal storage modulus may be varied by foaming the matrix resin so that the magnitude of the expansion ratio changes gradually. The matrix resin may be foamed and the expanded portion may be further impregnated with the resin so that the quantity of the impregnation changes gradually. Additionally, the modulus may be varied by changing the bridging density or the molecular weight of the matrix resin gradually, or by laminating thin materials with different hardnesses in an orderly fashion to form the shock-absorbing member.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A shock-absorbing material comprising a viscoelastic urethane elastomer resin matrix and a plurality of resinous microballoons, said shock-absorbing material having a normal storage modulus which is not less than 0.0628 MPa and is not greater than 0.234 MPa and is not greater than 0.234 MPa, and having a normal loss modulus which is not less than 0.0171 MPa and is not greater than 0.131 MPa.

2. A shock-absorbing material comprising a viscoelastic urethane elastomer resin matrix and a plurality of resinous microballoons, a percentage weight ratio of said resinous microballoons to said viscoelastic urethane elastomer matrix being not less than 1% and being not greater than 5%.

3. The shock-absorbing material of claim 2, wherein a ratio between a spring constant measured in tension and a spring constant measured in compression of the shock-absorbing material is not less than 1.1.

4. The shock-absorbing material of claim 3, wherein a normal storage modulus of said shock-absorbing material is not greater than 0.22 MPa.

5. A vehicle seat comprising a seat base, a seat cushion arrangement provided on said seat base, and a seat skin surface surrounding said cushion arrangement, said seat cushion arrangement including a cushion member and a shock-absorbing member, said shock-absorbing member comprising a viscoelastic material including a urethane elastomer matrix containing resinous microballons, said viscoelastic material having a normal storage modulus which is not less than 0.0628 MPa and is not greater than 0.234 MPa.

6. A vehicle seat comprising a seat base, a seat cushion arrangement provided on said seat base, and a seat skin surface surrounding said cushion arrangement, said seat cushion arrangement including a cushion member and a shock-absorbing member, said shock-absorbing member comprising a viscoelastic material including a urethane elastomer matrix containing resinous microballoons, said viscoelastic material having a normal loss modulus of not less than 0.0171 MPa and not greater than 0.131 MPa.

7. A vehicle seat comprising a seat base, a seat cushion arrangement provided on said seat base, and a seat skin surface surrounding said cushion arrangement, said seat cushion arrangement including a cushion member and a shock-absorbing member, said shock-absorbing member comprising a viscoelastic material including a urethane elastomer matrix containing resinous microballoons, a percentage weight ratio of said resinous microballoons to said viscoelastic urethane elastomer matrix being not less than 1% and being not greater than 5%.

8. The vehicle seat of claim 7, wherein a ratio between a spring constant measured in tension and a spring constant measured in compression of the shock-absorbing material is not less than 1.1.

9. The shock-absorbing material of claim 8, wherein a normal storage modulus of said shock-absorbing material is not greater than 0.22 MPa.

10. A vehicle seat comprising a seat base, a seat cushion arrangement provided on said seat base, and a seat skin surface surrounding said cushion arrangement, said seat cushion arrangement including a cushion member and a shock-absorbing member, said shock-absorbing member comprising a viscoelastic material including a urethane elastomer matrix containing resinous microballoons, said shock-absorbing member being embedded in said cushion member.

11. The vehicle seat of claim 10, wherein said viscoelastic material has a normal storage modulus which is not less than 0.0628 MPa and is not greater than 0.234 MPa.

12. The vehicle seat of claim 10, wherein said viscoelastic material has a normal loss modulus of not less than 0.0171 MPa and not greater than 0.131 MPa.

13. The vehicle seat of claim 10, wherein a percentage weight ratio of said resinous microballoons to said viscoelastic urethane elastomer matrix being not less than 1% and being not greater than 5%.

14. A vehicle seat comprising a seat base, a seat cushion arrangement provided on said seat base, and a seat skin surface surrounding said cushion arrangement, said seat cushion arrangement including a cushion member and a shock-absorbing member, said shock-absorbing member comprising a viscoelastic material including a urethane elastomer matrix containing resinous microballoons, said shock-absorbing member being disposed between said cushion member and said seat base.

15. The vehicle seat of claim 14, wherein said viscoelastic material has a normal storage modulus which is not less than 0.0628 MPa and is not greater than 0.234 MPa.

16. The vehicle seat of claim 14, wherein said viscoelastic material has a normal loss modulus of not less than 0.0171 MPa and not greater than 0.131 MPa.

17. The vehicle seat of claim 14, wherein a percentage weight ratio of said resinous microballoons to said viscoelastic urethane elastomer matrix being not less than 1% and being not greater than 5%.

18. A vehicle seat comprising a seat base, a seat cushion arrangement provided on said seat base, and a seat skin surface surrounding said cushion arrangement, said seat cushion arrangement including a cushion member and a shock-absorbing member having a length, a width, and a thickness, said shock-absorbing member comprising a viscoelastic material including a urethane elastomer matrix containing resinous microballoons, said shock-absorbing member having a non-uniform normal storage modulus.

19. The vehicle seat of claim 18, wherein the normal storage modulus of the shock-absorbing member varies in a longitudinal direction along the length of the shock-absorbing member.

20. The vehicle seat of claim 19, wherein the normal storage modulus of the shock-absorbing member varies in a vertical direction over the thickness of the shock-absorbing member.

21. The vehicle seat of claim 19, wherein the normal storage modulus of the shock-absorbing member varies in a transverse direction along the width of the shock-absorbing member.

22. The vehicle seat of claim 21, wherein the normal storage modulus of the shock-absorbing member varies in a vertical direction over the thickness of the shock-absorbing member.

23. The vehicle seat of claim 18, wherein the normal storage modulus of the shock-absorbing member varies in a transverse direction along the width of the shock-absorbing member.

24. The vehicle seat of claim 23, wherein the normal storage modulus of the shock-absorbing member varies in a vertical direction over the thickness of the shock-absorbing member.

25. The vehicle seat of claim 18, wherein the normal storage modulus of the shock-absorbing member varies in a vertical direction over the thickness of the shock-absorbing member.

* * * * *

UNITED STATES PATENT AND TRADEMARK OFFICE
CERTIFICATE OF CORRECTION

PATENT NO.   : 5,833,320
DATED        : November 10, 1998
INVENTOR(S)  : Kaneko

It is certified that error appears in the above-identified patent and that said Letters Patent is hereby corrected as shown below:

Column 15,
Line 11-12 please delete "and is not greater than 0.234 MPa,".

Signed and Sealed this

Twenty-fourth Day of December, 2002

JAMES E. ROGAN
*Director of the United States Patent and Trademark Office*